(12) United States Patent
Matsui et al.

(10) Patent No.: US 6,520,858 B2
(45) Date of Patent: *Feb. 18, 2003

(54) VIDEO GAME APPARATUS, CHARACTER-BEHAVIOR-INSTRUCTING METHOD IN VIDEO GAME, AND MACHINE-READABLE-RECORDING MEDIUM RECORDING CHARACTER-BEHAVIOR-INSTRUCTING PROGRAM

(75) Inventors: Masanori Matsui, Kobe (JP); Hideyuki Fujiwara, Neyagawa (JP)

(73) Assignee: Konami Co., Ltd., Hyogo-ken (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/193,534

(22) Filed: Nov. 17, 1998

(65) Prior Publication Data

US 2001/0041617 A1 Nov. 15, 2001

(30) Foreign Application Priority Data

Nov. 20, 1997 (JP) .............................................. 9-319678

(51) Int. Cl.⁷ .......................... A63F 13/00; G06F 17/00; A63B 69/18
(52) U.S. Cl. ............................. 463/43; 463/1; 434/253
(58) Field of Search .............................. 463/1, 6, 7, 31, 463/38, 43, 23, 2–4, 30, 32–34, 36, 44; 434/253, 255, 257; 482/71; 273/440–441, 317.1, 461; 280/842; 472/90

(56) References Cited

U.S. PATENT DOCUMENTS

| | | | | |
|---|---|---|---|---|
| 4,660,828 A | * | 4/1987 | Weiss | ........................ 272/138 |
| 4,679,789 A | * | 7/1987 | Okada | ........................ 273/1 E |
| 5,947,819 A | * | 9/1999 | Ohshima | ........................ 463/2 |
| 5,951,357 A | * | 9/1999 | Mandle et al. | .............. 446/138 |
| 5,963,218 A | * | 10/1999 | Naka et al. | ................. 345/474 |
| 6,066,046 A | * | 5/2000 | Yamamotto | .................... 463/7 |
| 6,155,926 A | * | 12/2000 | Miyamoto et al. | ............ 463/32 |

FOREIGN PATENT DOCUMENTS

| | | |
|---|---|---|
| JP | 10-207341 | 8/1998 |
| JP | 11-114230 | 4/1999 |
| JP | 11-119639 | 4/1999 |

OTHER PUBLICATIONS

Fighting Studio, "Complete capture series (30) of PlayStation, Tekken 2, complete version showing how to win the game", new version, Kabushiki Kaisha Futabasha, Oct. 30, 1997, p. 10.

(List continued on next page.)

*Primary Examiner*—Kim Nguyen
(74) *Attorney, Agent, or Firm*—Jordan and Hamburg LLP

(57) ABSTRACT

A video game apparatus, method and medium increases simulation realism of a jump action by using an operation stick bendable from its upright position. A controller-operation detection unit detects values of the x-coordinate and the y-coordinate which correspond to a bend direction and a bend angle of an operation stick; jump control unit starts a run-up action when an A-button is turned on, in which if the operation stick is not bent towards the back end, processing immediately shifts to a jump action process; and jump conditions are determined on the basis of a changed information regarding the values of the x-coordinate and the y-coordinate at the time when the stick is bent from the back end to the upright position and the position of a ski-jumping competitor corresponding to a takeoff of a ski-jumping hill at the time of the operation of the operation stick.

8 Claims, 4 Drawing Sheets

OTHER PUBLICATIONS

Monthly Game Walker, Kabushiki Kaisha Kadokawa shorten, Nov. 1, 1997, the forth vol., No. 11, $37^{th}$ issue, p. 109.

Edward Fielding: "Bruce Jenner's World Class Decathlon—Games Domain Review" Retrieved From the Internet, Jul. 1996, pp. 1–4, XP002103395 http://www.gamesdomain.com/gdreview/zones/reviews/pc/july96/bruce_ie.html * p. 3, paragraph 2 *.

"Cool Boarders" Retrieved From the Internet, Jan. 31, 1997, pp. 1–2, XP002103396 http://videogames.com/psx/sports/coolboar/review.html *p. 1, paragraph 2 *.

Tasos Kaiafas: "Front Page Sports: Ski Racing" Retrieved From the Internet, Feb. 10, 1998, pp. 1–2, XP002103397 http://www.gamespot.com/sports/fpsski/printable review-w.html * p. 1, paragraph 2 *.

* cited by examiner

VIDEO GAME APPARATUS, CHARACTER-BEHAVIOR-INSTRUCTING METHOD IN VIDEO GAME, AND MACHINE-READABLE-RECORDING MEDIUM RECORDING CHARACTER-BEHAVIOR-INSTRUCTING PROGRAM

BACKGROUND OF THE INVENTION

1. Field of the Invention

The present invention relates to a video game apparatus using a program-data recording medium, for example, a cassette recording medium using therein an optical disk, a magnetic disk, and a semiconductor memory. It also relates to a character-behavior-instructing method and a recording medium containing therein a character-behavior-instructing program which are to be used for a video game.

2. Description of the Related Art

Hitherto, a large number of game systems have been proposed, such as a system consisting of a home-use dedicated machine with a television monitor, a business-use dedicated machine, and a system consisting of a personal computer or a computer workstation, a display, and a sound-output device.

All of these game systems or machines are composed of a controller to be operated by a game player, a machine-readable recording medium containing therein game program data, a CPU for controlling the production of sounds and images on the basis of the game program data, a processor for producing images, a processor for producing sounds, a CRT for displaying images, and a speaker for outputting sounds. As the recording medium, a CD-ROM (compact-disk read-only memory), a semiconductor memory, and a cassette medium containing therein a semiconductor memory are frequently employed.

One of the games considered to be performable in a game system such as that described above is a ski-jumping competition game in which a simulated ski-jumping hill is provided in a game space and a character simulating a ski-jumping competitor displayed on a display means competes for scores of ski-jumping.

According to proposals hitherto made in this field, the ski-jumping competition game can be considered to be the following kind. A simulated ski-jumping competitor on a simulated ski-jumping hill displayed on a display means starts a run-up action according to an instruction issued by a game player by use of, for example, a button or buttons of a game controller, and when the ski-jumping competitor has reached a takeoff point of the jumping hill run-up, an instruction for leaping out from the takeoff point is then issued by the game player by use of the same or a different button of the controller. A game of this kind, however, requires a game player to simply push a button or buttons of the game controller, this lacking the aspect of a function for providing simulation realism as a video game.

SUMMARY OF THE INVENTION

In consideration of the foregoing, an object of the present invention is to provide a video game apparatus that comprises a stick-type controller having therein an operation stick that is bendable from its upright position, thereby increasing the simulation realism in the game operation for the jump action; a character-behavior-instructing method; and a recording medium containing therein a character-behavior-instructing program for use in the video game.

To these ends, according to one aspect of the present invention, there is provided a video game apparatus in which a character displayed on a display means is allowed to perform a jump action in a game space, comprising a stick-type controller having therein an operation stick bendable at least in one direction from its upright position, and outputting information regarding at least one bend angle of a bend direction and a bend angle of the operation stick; instructing means for instructing the character to start a run-up action; and jump control means for allowing, after a run-up start instruction is given, the character to perform a jump action upon receiving the information regarding the bend angle of the operation stick.

According to another aspect of the present invention, there is provided a video game apparatus in which the jump conditions include a leap-out angle of the ski-jumping competitor.

According to still another aspect of the present invention, there is provided a character-behavior-instructing method for use in a video game in which a character displayed on a display means is allowed to perform a jump action following a run-up action, comprising the steps of allowing the character to perform a jump action upon receiving changed information regarding a bend angle of an operation stick bendable at least in one direction from its upright position.

According to yet another aspect of the present invention, there is provided a recording medium containing therein a character-behavior-instructing program for use in a video game in which a character displayed on a display means is allowed to perform a jump action following a run-up action, comprising a jump action step of allowing the character to perform a jump action upon receiving changed information regarding a bend angle of an operation stick bendable at least in one direction from its upright position.

In the present invention, after a run-up start instruction is given, the character may be allowed to perform a run-up action only when the operation stick is kept bent in a single direction; whereby a preparatory operation for the jump action can be performed, and a video game providing increased simulation realism can be realized.

Furthermore, a game space that simulates an actual ski-jumping hill comprising an approach and a takeoff and a character that simulates an actual ski-jumping competitor may be provided, detection may be performed for the position of the ski-jumping competitor on the approach corresponding to the takeoff at the time in which the bend angle of the operation stick is changed, and jump conditions for the ski-jumping competitor may then be determined on the basis of changed information regarding the bend angle of the operation stick and the detected position; whereby the jump distance can be arranged to be variable depending upon whether or not the operation stick is appropriately operated, enhancing the interest of the video game.

DESCRIPTION OF THE PREFERRED EMBODIMENT

Figure 1:
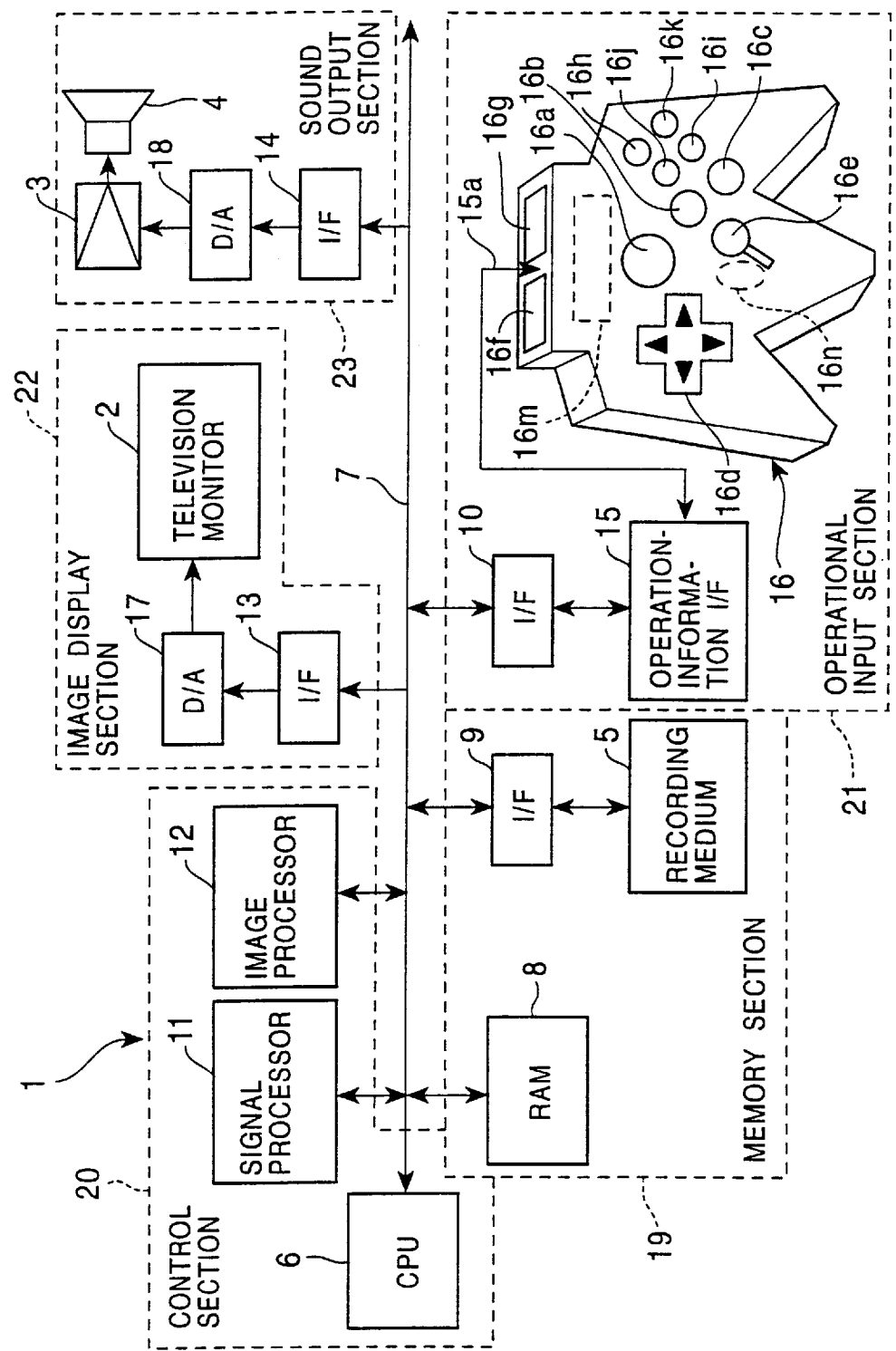
FIG. 1 is a schematic diagram of a game system as an embodiment of the present invention.

Referring to FIG. 1, a schematic diagram, a description will be given of a configuration of a game system 1 of a preferred embodiment of the present invention.

The game system 1 according to this embodiment comprises a game-machine main assembly, a television monitor 2 to display game images, an amplifying circuit 3 and speaker 4 to output game sounds, and a recording medium 5 containing therein game data comprised of image data, sound data, and program data. For reference, the recording medium 5 is, for example, a so-called cassette ROM, an optical disk, or a flexible disk that is housed in a plastic package and contains therein game data and program data for an operating system.

The game-machine main assembly has the following configuration. Addresses and a bus 7 composed of data and a control bus are connected to a CPU 6; a RAM 8, an interface circuit 9, an interface circuit 10, a signal processor 11, an image processor 12, an interface circuit 13, and an interface circuit 14 are connected to the bus 7; a controller 16 is connected to the interface circuit 10 via an operation-information interface circuit 15; a D/A converter 17 is connected to the interface circuit 13; and a D/A converter 18 is connected to the interface circuit 14.

Sectional constitution of this configuration and functions of constituents such as the processors and controller are described below.

The RAM 8, the interface circuit 9, and the recording medium 5 constitute a memory section 19; the CPU 6, the signal processor 11, and the image processor 12 constitute a control section 20 that controls the game progress; the interface circuit 10, the operation-information interface circuit 15, and the controller 16 constitute an operational-input section 21; the television monitor 2, the interface circuit 13, and the D/A converter 17 constitute an image display section 22; and the amplifying circuit 3, the speaker 4, the interface circuit 14, and D/A converter 18 constitute a sound-output section 23.

The signal processor 11 mainly performs calculations in a three-dimensional space, calculation for positional transformation from a three-dimensional space to a pseudo-three-dimensional space, calculation of light sources, and creation and manipulation of sound data. The image processor 12 refers to results of the calculations performed by the signal processor 11 to perform writing of data of an image to be created in the RAM 8, for example, writing of texture data for polygons in an area of the RAM 8.

The controller 16 comprises a start button 16a, an A-button 16b, a B-button 16c, a cross key 16d, a stick-type controller 16e, a left trigger button 16f, a right trigger button 16g, a C1 button 16h, a C2 button 16i, a C3 button 16j, a C4 button 16k, a connector 16m, and a depth trigger button 16n. The connector 16m is designed so as to be attached to, for example, a removable memory that temporarily stores therein data such as game-progress data.

The stick-type controller 16e has almost the same configuration as a joy stick of game systems. The controller 16e comprises a stick (an operation rod) 16p installed upright therein, which is bendable around a predetermined support point in the direction of 360°, including the left-right and back-forth directions. Conforming to the bend direction and bend angle of the stick 16p, an x-coordinate value in the left-right direction and a y-coordinate value in the back-forth direction (up-down direction in FIG. 1), both coordinates being based on the original upright position, are arranged to be sent to the CPU 6 via the interface circuits 15 and 10.

Regarding the configuration of the aforementioned game system 1, it varies according to its use, for example, for home use or business use. For home-use configuration of the game system 1, the television monitor 2, the amplifying circuit 3, and the speaker 4 are separated from the game-machine main assembly. For business-use configuration of the game system 1, however, all the components shown in FIG. 1 are integrally packaged in a single housing.

When the game system 1 is configured on the basis of a personal computer or a workstation as a nucleus, the television monitor 2 corresponds to a display unit of the computer; the image processor 12 corresponds to part of the game program data recorded in the recording medium 5 or hardware on an expansion slot mounted on an expansion board of the computer; and interface circuits 9, 10, 13, and 14, D/A converters 17 and 18, and the operation-information interface circuit 15 correspond to the hardware on the expansion slot mounted on the expansion board of the computer. Regarding the RAM 8, it corresponds to the main memory or the expansion memory area of the computer.

In this embodiment, a description will be given taking an example case where the game system 1 is configured for home use.

Hereinbelow, an overall operation of the game system 1 will be described with reference to FIG. 1.

When a power switch (not shown) is turned on and then the game system 1 is powered on, in accordance with an operating system which is stored in the recording medium 5, the CPU 6 reads data of images, sounds, and the game program from the recording medium 5, and all or part of the CPU-read data is transferred to the RAM 8 to be stored therein. The CPU 6 then commands the game to proceed on the basis of the game program data contained in the RAM 8 and instructions issued by a game player by use of the controller 16. In particular, the CPU 6 generates commands as its task for creating images and outputting sounds as and when required by instructions issued by a game player by use of the controller 16.

On the basis of the CPU-generated commands, the signal processor 11 performs calculations such as a character-position calculation and a light-source calculation in a three-dimensional space (the same as in a two-dimensional space, as a matter of course) and creation and manipulation of sound data.

Consecutively, on the basis of results of the aforementioned calculations by the signal processor 11, the image processor 12 performs writing of an image to be created in the RAM 8, and the like. The data written in the RAM 8 is then transferred to the D/A converter 17 via the interface circuit 13 in which the data is converted to an analog signal, and then the data is transferred to the television monitor 2 to be displayed on a display screen thereof as an image. On the other hand, the data which has been output from the signal processor 11 is transferred to the D/A converter 18 via the interface circuit 14 in which the data is converted to an analog signal, and then it is transferred to the speaker 4 via the amplifying circuit 3 to be output from the speaker 4 as sounds.

Figure 2:
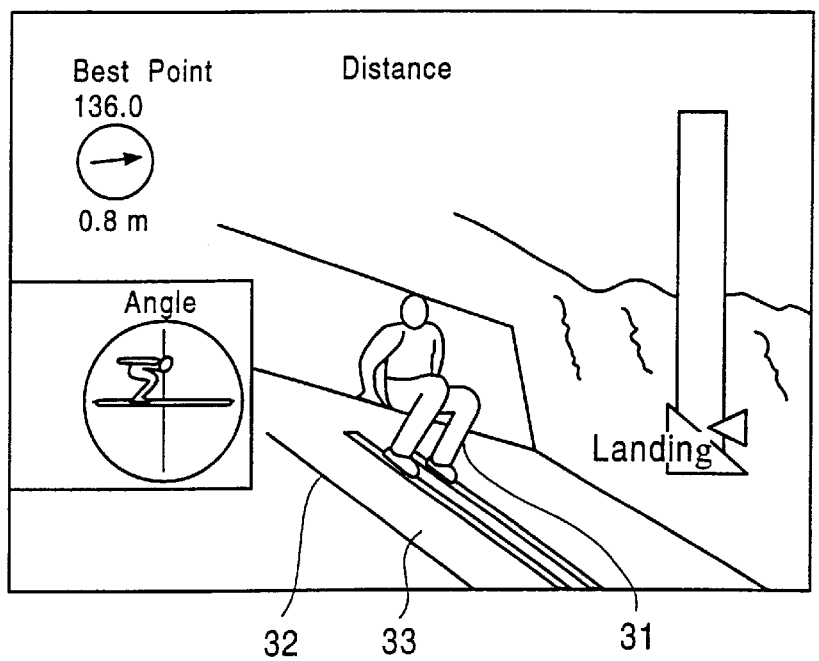
FIG. 2 is a drawing showing an image picture of a game.
Figure 3:
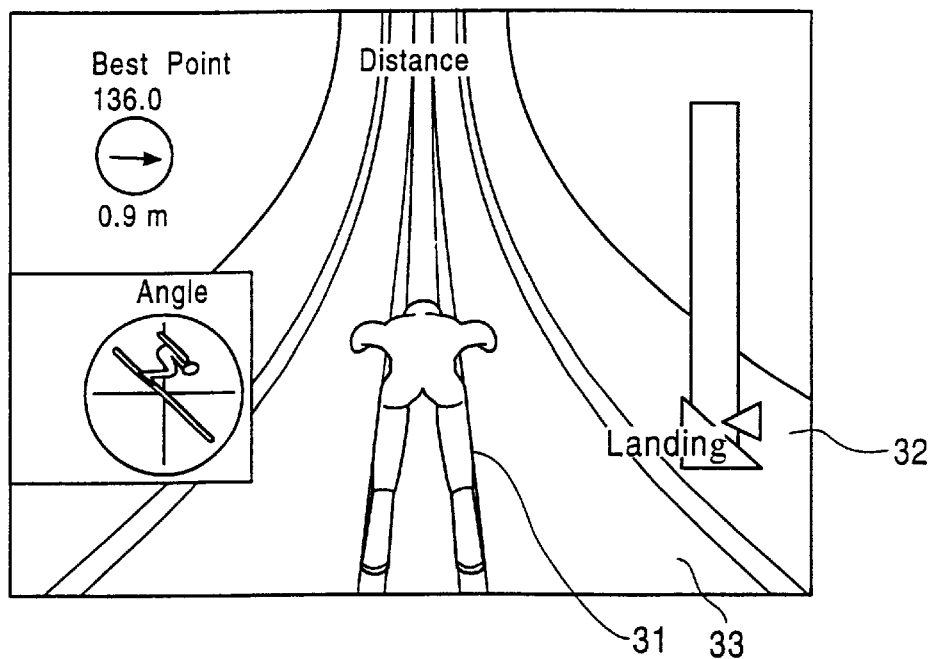
FIG. 3 is a drawing showing an image picture of the game.
Figure 4:
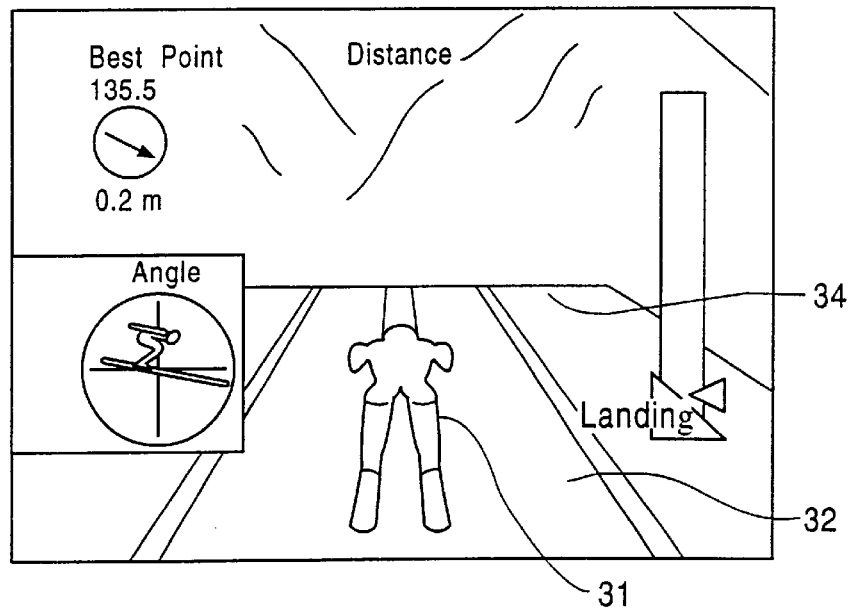
FIG. 4 is a drawing showing an image picture of the game.

Next, a description will be given of examples of display images of a game to be played with this game system with reference to FIGS. 2 through 4. FIGS. 2 through 4 each shows a drawing of the display image.

This game system allows a game simulating a ski-jumping competition to be performed, displaying a character simulating a competitor of the ski-jumping competition on a screen. As FIGS. 2 through 4 show, a ski-jumping competitor 31 is displayed substantially in the center of the screen, the highest score is displayed at an upper left corner of the screen, the wind direction and the wind speed are displayed below the highest score, the bend angle of the ski-jumping competitor 31 against the horizontal line is displayed below the wind speed, the jump distance achieved by the ski-jumping competitor 31 is displayed in an upper central area of the-screen, and the height of the ski-jumping competitor 31 is displayed in a central right area of the screen.

FIG. 2 is a drawing showing the ski-jumping competitor 31 in a stand-by state, in which an approach 33 of a ski-jumping hill 32 is seen below the ski-jumping competitor 31 and the angle is shown as almost the horizontal. In this state, when an instructing means (such as the A-button 16*b* of the controller 16) to allow the character to start the run-up action is operated in this state, the run-up action is then started.

FIG. 3 is a drawing in which the visual point position is behind the ski-jumping competitor 31, the approach 33 extends forward, and the angle of the ski-jumping competitor 31 is shown as a bent-forward style along the approach 33.

FIG. 4 is a drawing showing the ski-jumping competitor 31 approaching a takeoff 34. As will be described later, when the competitor 31 has arrived at a position immediately before the takeoff 34, operating the stick-type controller 16*e* will cause a jump action to be performed.

In the game with this game system 1, similarly to the actual ski-jumping competition, scores are calculated by the total of a distance score and a style score so that a single game player plays the game aiming at a high score, or a plurality of game players compete with each other for scores by alternately operating the controller 16.

Next, the function of the CPU 6 will be described below using FIG. 5 and referring to FIGS. 2 through 4.

Figure 5:
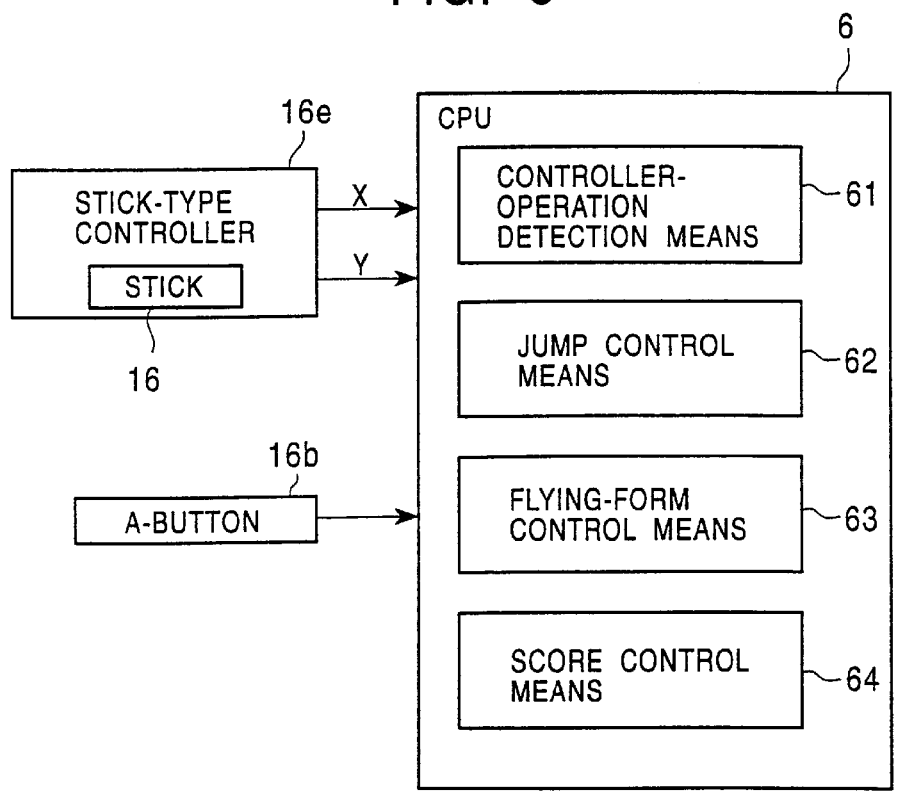
FIG. 5 is a schematic diagram showing functional blocks of a CPU and an A-button of a stick-type controller.

FIG. 5 is a schematic diagram showing the CPU 6 and function means therein included, the stick-type controller 16*e,* and the A-button 16*b*. As therein shown, the function means included in the CPU 6 are controller-operation detection means 61, jump control means 62, flying-form control means 63, and score control means 64.

The controller-operation detection means 61 detects an on-off state of the A-button 16*b* and values of the x-coordinate and y-coordinate which correspond to the bend direction and the bend angle of the stick 16*p,* the bend angle and the bend direction being transferred from the stick-type controller 16*e*.

The jump control means 62, which controls a jump action of the ski-jumping competitor 31 displayed on the screen, comprises the following functions (A) through (H):

(A) When the A-button 16*b* in the stand-by state, as shown in FIG. 2, is turned on, the jump control means 62 sends a run-up start instruction signal to the signal processor 11 to instruct the competitor 31 to start a run-up action.

(B) After the time point wherein the run-up start instruction signal is output, the jump-control means 62 determines whether the stick 16*p* of the stick-type controller 16*e* is bent in one direction, for example, to the back end, and when it finds that the stick 16*p* is not bent to the back end (in the downward direction in FIG. 1), it sends a run-up start instruction signal to the signal processor 11 to allow the competitor 31 to perform a jump action. Therefore, the ski-jumping competitor 31 will start the jump action along the approach 33 unless the stick 16*p* of the stick-type controller 16*e* is bent to the back end in advance and this bent state is maintained when allowing the competitor 31 to start the run-up action by turning on the A-button 16*b*.

(C) The jump control means 62 records in the RAM 8 (FIG. 1) the changed information (bent trails of the stick 16*p*) of the x-coordinate and the y-coordinate which is output from the stick-type controller 16*e* when the stick 16*p* thereof is operated in the direction from the back end toward the upright position (upward direction in FIG. 1), i.e. the x-coordinate and y-coordinate values of preset sampling time.

(D) The jump control means 62 performs detection of the position of the ski-jumping competitor 31 for the takeoff 34 of the ski-jumping hill 32 when the stick 16*p* is operated in the direction from the backward position toward the upright position, i.e. when a jump instruction signal is output. This detection is performed by calculation of the distance between the values of the x-coordinate of the takeoff 34 and the y-coordinate of the ski-jumping competitor 31 in the game space.

(E) The jump control means 62 determines a jump reception time which accepts the changed information of the x-coordinate and y-coordinate values which are output from the stick-type controller 16*e*. This jump reception time is preset from the time where a jump instruction signal is output. When the jump reception time has elapsed or the stick 16*p* is bent to the back end (upward direction in FIG. 1), the means 62 determines the jump conditions described below and allows the ski-jumping competitor 31 to leap out in the air.

(F) The jump control means 62 determines the jump conditions on the basis of the changed information of the x-coordinate and y-coordinate values which are output from the stick-type controller 16*e* and the position of the ski-jumping competitor 31 when a jump instruction is output. The jump conditions are, for example, the leap-out angle by which the jump distance is determined. For instance, if the stick 16*p* is operated at a high speed, a jump action is performed at an appropriate angle and the jump distance increases. If the stick 16*p* is operated in a somewhat diagonally rightward direction, the jump action is then performed at a leap-out angle in a somewhat diagonally rightward direction, the same as the stick 16*p*.

(G) The jump control means 62 controls the flight style of the ski-jumping competitor 31 in the air after the jump action is performed on the basis of the x-coordinate and the y-coordinate values which are output from the stick-type controller 16*e*. For instance, the jump action is performed in a right forward direction, operating the stick 16*p* in the leftward direction allows the jump attitude to be corrected.

(H) If the A-button 16*b* is turned on during the jump action, the jump control means 62 allows the ski-jumping competitor 31 to perform a landing action. The jump-control means 62 controls the landing action on the basis of the flight height of the competitor 31 when the A-button 16*b* is turned on. For instance, if the flight height of the competitor 31 is excessively low when the A-button 16*b* is turned on, the jump control means 62 forces the landing action to fail.

The scoring control means 63 calculates the scores similarly to an actual jumping competition. It calculates the scores of the ski-jumping competitor with a distance score that is set according to the distance jumped and style score that is set according to style such as flight style and landing posture, and adopts a scoring method which is based on the actual competition scoring rule by programming. To achieve these, the scoring control means 63 comprises the stick-type controller 16*e* and operation data of the buttons and operation timing data thereof. For reference, when the landing action has failed, the score is zero.

Figure 6:
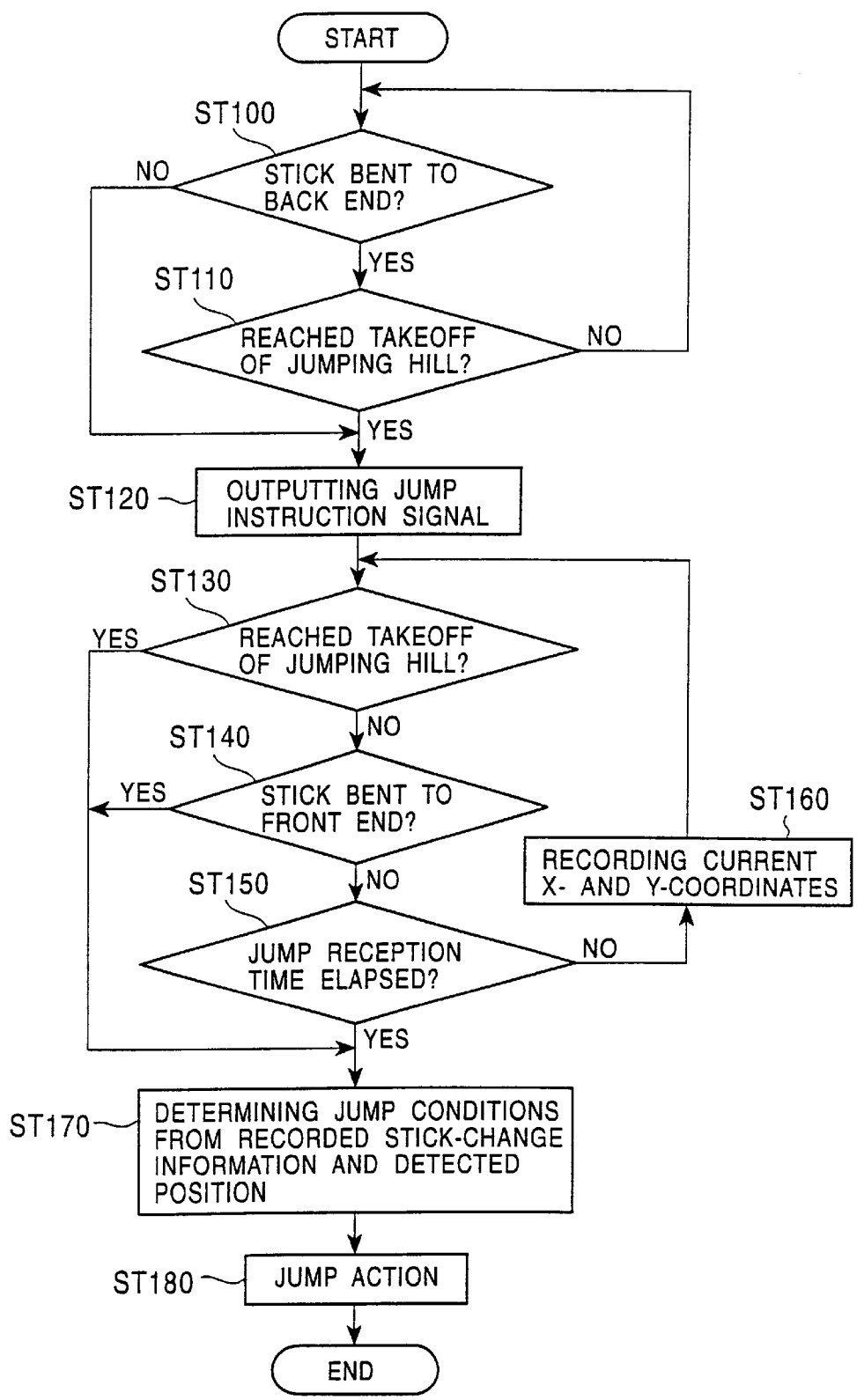
FIG. 6 is a flowchart of a subroutine for a run-up action.

FIG. 6 is a flowchart of a subroutine for a run-up action. When the A-button 16b is turned on in the state shown in FIG. 2, the run-up action is started and the process enters this subroutine.

First, a determination is performed of whether or not the stick 16p of the stick-type controller 16e is bent to the back end (step ST100). If the stick 16p is determined to have been bent to the back end (YES in step ST100), it is then determined whether or not the ski-jumping competitor 31 has reached the takeoff (step ST110). If the ski-jumping competitor 31 is found to have not yet reached the takeoff (NO in step ST110), the routine of steps ST100 and ST110 is repeated.

In this step 110, however, if the stick 16p is determined to have not been bent to the back end and if the ski-jumping competitor 31 is determined to have reached the takeoff (NO instep 100; YES in step 110), the jump instruction signal is then output, the position of the competitor 31 at this time on the approach 33 for the takeoff of the ski-jumping hill 32 is detected, and the processing then shifts to the processing for the jump action (step ST120). If the competitor 31 is determined to have already reached the takeoff of the jumping hill 32 (YES in step ST110), it is then assumed to be YES in step ST130 and the processing directly proceeds to step ST170.

Then, a determination is performed of whether or not the ski-jumping competitor 31 has reached the takeoff (step ST130) of the jumping hill 32. If the competitor 31 is determined to have reached the takeoff (YES in step ST130), the processing proceeds to step ST170. If the competitor 31 is found to have not yet reached the takeoff (NO in ST130), it is then determined whether or not the stick 16p of the stick-type controller 16e has been bent to the front end (step ST140). In step ST140, if the stick 16p is determined to have been bent to the front end (YES in step ST140), the processing proceeds to step ST170.

If the stick 16p is determined to have not been bent to the front end (NO in step ST140), however, it is then determined whether or not the jump reception time has elapsed (step ST150). Until the reception time has elapsed (NO in step ST150), the current values of the x-coordinate and the y-coordinate of the stick 16p are recorded in the RAM 8 (step ST160). The processing then returns to step ST170.

If the jump reception time is determined to have elapsed (YES in step ST150), the processing proceeds to step ST170. Consecutively in step ST170, jump conditions are determined on the basis of the changed information of the values of the x-coordinate and the y-coordinate which are sequentially recorded in the RAM 8, i.e. bend trails of the stick 16p, and the position of the ski-jumping competitor which has been detected in step ST120. Then, the ski-jumping competitor 31 receives a jump instruction, i.e. the competitor 31 is instructed for a takeoff action (step ST180), and this subroutine terminates.

As described above, in this embodiment, the stick-type controller 16e which is bendable from its upright position in the direction of 360°, including the left-right and back-forth directions, is used; the run-up action is allowed to be performed in a state where the stick 16p is bent to the back end; and the jump action is allowed to be performed by a bend operation of the stick 16p to the upright position; whereby, as compared to the operation in which buttons are simply pushed, an action more similar to a takeoff action in the actual jumping competition can be performed, and a video game providing simulation realism can be performed.

The present invention is not limited to the above embodiment and the following modifications (a) through (e) may be employed.

(a) The operation of the stick 16p to the back end to allow the ski-jumping competitor 31 to perform the run-up action is not limited to an operation to a position exactly in the center of the back end and it may be performed within a predetermined width. Also, as long as the stick 16p is bent to an allowable position, it may be operated from its upright position to the back end in any direction.

(b) The above embodiment is applied to the ski-jumping competition, but it may be applied to other competitions involving a jump action to be performed after a run-up action, such as a high-jump competition, long-jump competition, and pole-vault competition.

(c) In the above embodiment, the stick-type controller 16e is bendable from its upright position in the direction of 360°, including left-right and back-forth directions; however, not limiting to it, a stick-type controller that is bendable from its upright position in at least one direction may be used. In this modification, the run-up action may be arranged to be performed by a bend operation to an end in a single direction and the jump action may be arranged to be performed by a returning operation of the stick 16p to the upright position. Furthermore, a stick-type controller that is bendable from its upright position in the back-forth direction may be used.

(d) In the above embodiment, the stick-type controller 16e is bent to a back end and then bent back to the upright position to cause a run-up action; however, the reverse operation may be possible. That is, the controller 16e may be bent to the front end and may be bent back to the upright position to cause the run-up action.

(e) In the above embodiment, the stick-type controller 16e is bent to the back end to cause the run-up action; however, it may be possible for the stick-type controller 16e to be kept in the upright without operation thereof and from the upright position, it may be bent to any direction to cause the jump action. This provides the same effects as those in the above embodiment.

As described above, in the present invention, a video game apparatus is provided in which a character is allowed to perform a jump action in a game space given therein, after a run-up start instruction is issued, the character is allowed to perform a jump action in response to a change of bend angle of an operation stick which is bendable at least in a single direction; whereby an operation for the jump action simulating an actual jump action can be performed, and a video game providing increased simulation realism can be realized.

In addition, in the present invention, after a run-up start instruction is given, the character is allowed to perform a run-up action only when the operation stick is kept bent in a single direction; whereby a preparatory operation for the jump action can be performed, and a video game providing increased simulation realism can be realized.

Furthermore, in the present invention, a game space that simulates an actual ski-jumping hill comprising an approach and a takeoff and a character that simulates an actual ski-jumping competitor are provided, detection is performed for the position of the ski-jumping competitor on the approach corresponding to the takeoff at the time when the bend angle of the operation stick is changed, and jump conditions for the ski-jumping competitor are then determined on the basis of changed information regarding the bend angle of the operation stick and the detected position; whereby the jump distance varies depending upon whether or not the operation stick is appropriately operated, enhancing the interest of the video game.

While the present invention has been described with reference to what is presently considered to be the preferred embodiment, it is to be understood that the invention is not limited to the disclosed embodiment. On the contrary, the invention is intended to cover various other modifications and equivalent arrangements included within the spirit and scope of the appended claims. The scope of the following claims is to be accorded the broadest interpretation so as to encompass all such modifications and equivalent structures and functions.

What is claimed is:

1. A video game apparatus in which a simulated ski-jumping competitor displayed on display means is allowed to perform a jumping action in a game space which includes a simulated ski-jumping hill with an approach and a takeoff, comprising:

a stick-type controller comprising an operation stick bendable at least in one direction from one stick position, and outputting information regarding at least one bend angle of a bend direction and a bend angle of said operation stick;

instructing means for instructing said competitor to start a run-up action; and jump control means for allowing, after a run-up start instruction is given, said competitor to perform a jump action upon detecting changes in the information regarding the bend angle of said operation stick, said jump control means enables, after the run-up start instruction is given, a run-up action to be performed only in a period of time where said operation stick is kept bent in said one stick position;

said jump control means detecting a takeoff position of said ski-jumping competitor on said approach corresponding to said takeoff, the bend angle of said operation stick being changed from said one stick position when the jump control means detects said takeoff position such that the changes in the bend angle of the stick determines jump conditions for said ski-jumping competitor according to the changed information regarding the bend angle of said operation stick and a position thereby detected.

2. A video game apparatus according to claim 1, in which said jump conditions include a leap-out angle of said ski-jumping competitor.

3. A video game apparatus in which a competitor displayed on display means is allowed to perform a jumping action in a game space which includes a simulated ski-jumping hill with an approach and a takeoff, comprising:

a stick-type controller comprising an operation stick bendable at least in one direction from one stick position, and outputting information regarding at least one bend angle of a bend direction and a bend angle of said operation stick;

instructing means for instructing said competitor to start a run-up action; and jump control means for allowing, after a run-up start instruction is given, said competitor to perform a jump action upon detecting changes in the information regarding the bend angle of said operation stick, said jump control means detecting a takeoff position of said ski-jumping competitor on said approach corresponding to said takeoff, the bend angle of said operation stick being changed from said one stick position when the jump control means detects said takeoff position such that the changes in the bend angle of the stick determines jump conditions for said ski-jumping competitor according to the changed information regarding the bend angle of said operation stick and a position thereby detected.

4. A video game apparatus according to claim 3 wherein said display means displays the run up action from a start position to the take-off position while said stick is in said one stick position.

5. A video game apparatus according to claim 4 whereby the jump control means controls a direction of flight of the competitor after initiation of a displayed jump action by enabling control of the direction of flight of the competitor depending on an angle of movement of said stick.

6. A video game apparatus according to claim 3 whereby said jump control means controls a jump distance, said stick-type controller outputting information to the jump control means to control the jump distance depending on a speed of movement of said stick from said one stick position.

7. A video game apparatus according to claim 3 whereby the jump control means controls a leap-out direction angle, said stick-type controller outputting information to the jump control means to control the leap-out direction angle depending on an angle of movement of said stick from said one stick position.

8. A video game apparatus according to claim 3 wherein said stick-type controller provides an upright position for said stick, said one stick position being a non-upright position angularly displaced from said upright position, said upright position being disposed generally forwardly of said non-upright position, said stick being moved generally upwardly and forwardly from said non-upright position toward said upright position upon said competitor reaching said take-off position such that said generally upward and forward movement of said stick simulates a leap-off action of the competitor from the take-off position.

* * * * *